US009721561B2

(12) United States Patent
Tang et al.

(10) Patent No.: US 9,721,561 B2
(45) Date of Patent: Aug. 1, 2017

(54) METHOD AND APPARATUS FOR SPEECH RECOGNITION USING NEURAL NETWORKS WITH SPEAKER ADAPTATION

(71) Applicant: Nuance Communications, Inc., Burlington, MA (US)

(72) Inventors: Yun Tang, Montreal (CA); Venkatesh Nagesha, Wayland, MA (US); Xing Fan, Arlington, MA (US)

(73) Assignee: Nuance Communications, Inc., Burlington, MA (US)

( * ) Notice: Subject to any disclaimer, the term of this patent is extended or adjusted under 35 U.S.C. 154(b) by 248 days.

(21) Appl. No.: 14/098,259

(22) Filed: Dec. 5, 2013

(65) Prior Publication Data

US 2015/0161994 A1    Jun. 11, 2015

(51) Int. Cl.
| | | |
|---|---|---|
| G10L 15/00 | (2013.01) | |
| G10L 15/16 | (2006.01) | |
| G10L 15/02 | (2006.01) | |
| G10L 15/06 | (2013.01) | |
| G10L 15/07 | (2013.01) | |

(52) U.S. Cl.
CPC .............. G10L 15/16 (2013.01); G10L 15/02 (2013.01); G10L 15/063 (2013.01); G10L 15/07 (2013.01); G10L 2015/025 (2013.01)

(58) Field of Classification Search
CPC ......... G10L 15/02; G10L 15/16; G10L 25/30; G10L 15/08; G10L 15/20; G10L 17/06; H04N 19/119; H04N 19/124; H04N 19/134

USPC ....... 704/232, 259, 255, 250, 246, 244, 241, 704/236, 235, 234; 84/615; 714/33; 706/16
See application file for complete search history.

(56) References Cited

U.S. PATENT DOCUMENTS

| | | | | |
|---|---|---|---|---|
| 6,917,919 | B2 * | 7/2005 | Botterweck | G06K 9/6247 704/255 |
| 7,304,231 | B2 * | 12/2007 | van Pinxteren | G06F 17/30743 382/173 |
| 7,358,502 | B1 * | 4/2008 | Appleby | G03B 42/04 250/370.14 |
| 8,145,483 | B2 * | 3/2012 | Li | G10L 15/02 704/231 |

(Continued)

OTHER PUBLICATIONS

Hinton et al, Deep Neural Networks for Acoustic Modeling in Speech Recognition, Apr. 27, 2012, IEEE with IBM, Microsoft, and Google, draft and final edition, all pages.*

(Continued)

*Primary Examiner* — Michael Colucci
(74) *Attorney, Agent, or Firm* — Hamilton, Brook, Smith & Reynolds, P.C.

(57) ABSTRACT

In a speech recognition system, deep neural networks (DNNs) are employed in phoneme recognition. While DNNs typically provide better phoneme recognition performance than other techniques, such as Gaussian mixture models (GMM), adapting a DNN to a particular speaker is a real challenge. According to at least one example embodiment, speech data and corresponding speaker data are both applied as input to a DNN. In response, the DNN generates a prediction of a phoneme based on the input speech data and the corresponding speaker data. The speaker data may be generated from the corresponding speech data.

20 Claims, 3 Drawing Sheets

(56) References Cited

U.S. PATENT DOCUMENTS

| | | | | |
|---|---|---|---|---|
| 8,527,276 | B1* | 9/2013 | Senior | G06N 3/084 704/258 |
| 8,700,400 | B2* | 4/2014 | Povey | G10L 15/065 704/243 |
| 8,811,700 | B2* | 8/2014 | Wang | G06T 11/006 382/128 |
| 8,996,368 | B2* | 3/2015 | Willett | G10L 15/02 704/231 |
| 9,094,681 | B1* | 7/2015 | Wilkins | H04N 19/119 |
| 9,510,019 | B2* | 11/2016 | Gu | H04N 19/176 |
| 2006/0111904 | A1* | 5/2006 | Wasserblat | G10L 17/00 704/246 |
| 2007/0019831 | A1* | 1/2007 | Usui | H04R 3/12 381/300 |
| 2007/0110290 | A1* | 5/2007 | Chang | G06T 5/001 382/128 |
| 2007/0220342 | A1* | 9/2007 | Vieira | G06F 11/3688 714/33 |
| 2008/0195387 | A1* | 8/2008 | Zigel | G10L 17/06 704/236 |
| 2008/0249774 | A1* | 10/2008 | Kim | G10L 17/02 704/250 |
| 2011/0060587 | A1* | 3/2011 | Phillips | G10L 15/30 704/235 |
| 2011/0066434 | A1* | 3/2011 | Li | G10L 15/10 704/241 |
| 2012/0128238 | A1* | 5/2012 | Kameyama | G06T 3/4053 382/159 |
| 2014/0149112 | A1* | 5/2014 | Kalinli-Akbacak | G10L 25/03 704/232 |
| 2014/0156575 | A1* | 6/2014 | Sainath | G06N 7/005 706/16 |
| 2014/0257805 | A1* | 9/2014 | Huang | G10L 15/063 704/232 |
| 2015/0199963 | A1* | 7/2015 | Maaninen | G10L 15/28 704/232 |

OTHER PUBLICATIONS

Hinton et al, "Deep Neural Networks for Acoustic Modeling in Speech Recognition", 2013, University of Toronto, all pages.*

ASRU 2013, Automatic Speech Recognition and Understanding Workshop, Paper presented at the *IEEE* Conference, Dec. 8-12, 2013, Olomouc, Czech Republic (Dec. 2013).

Yao, K., et al., "Adaption of Context-Dependent Deep Neural Networks for Automatic Speech Recognition," Paper presented at the *IEEE* Conference (2012).

Li, B., and Sim, Khe Chai, "Comparison of Discrimination Input and Output Transformations for Speaker Adaption in the Hybrid NN/HMM Systems," *Interspeech* 2010 (Sep. 2010).

Neto, J., et al., "Speaker-Adaption for Hybrid HMM-ANN Continuous Speech Recognition System," 4th European Conference on Speech Communication and Technology, Eurospeech '95, Madrid, Spain (Sep. 1995).

International Search Report and Written Opinion of PCT/US2014/068839 dated Apr. 1, 2015 entitled "Method and Apparatus for Speech Recognition Using Neural Networks With Speaker Adaptation".

Seide, et al. "Feature Engineering in Context-Dependent Deep Neural Networks for Conversational Speech Transcription", 2011 IEEE Workshop on Automatic Speech Recognition and Understanding, Waikoloa, HI, Dec. 11-15, 2011.

Liao, H., "Speaker Adaptation on Context Dependent Deep Neural Networks", 2013 IEEE International Conference on Acoustics, Speech and Signal Processing, Vancouver BC, May 23-31, 2013.

Rath, et al., Improved Feature Processing for Deep Neural Networks: Interspeech 2013—14th Annual Conference of the International Speech Communication Association, Aug. 25, 2013.

Lei, et al, "Deep Neural Networks with Auxiliary Gaussian Mixture Models for Real-Time Speech Recognition", 2013 IEEE International Conference on Acoustics, Speech and Signal Processing, Vancouver BC, May 26, 2013.

Tang, et al. "Deep Neural Network Trained with Speaker Representation for Speaker Normalization", 2014 IEEE International Conference on Acoustics, Speech and Signal Processing, IEEE, p. 6329-6333, May 4, 2014.

International Preliminary Report on Patentability; International Application No. PCT/US2014/068839; Date of Mailing: Jun. 16, 2016; Entitled: "Method and Apparatus for Speech Recognition Using Neural Networks With Speaker Adaptation."

* cited by examiner

| Input Features to HMM/GMM model | DNN adaptation | HMM/GMM adaptation | |
|---|---|---|---|
| | | None | 4min |
| MFCC | None | 10.76 | 8.74 |
| DNN | | 9.23 | 7.95 |
| DNN(CMLLR) | Yes | 8.57 | 7.75 |
| DNN(MLLR) | Yes | 8.39 | 7.69 |

FIG. 3

METHOD AND APPARATUS FOR SPEECH RECOGNITION USING NEURAL NETWORKS WITH SPEAKER ADAPTATION

BACKGROUND

Neural networks (NN) are widely used in automatic speech recognition. In particular, neural networks (NN) may be employed in feature extraction or phoneme recognition. When used in phoneme recognition, neural networks are typically trained with set of training data. During a training phase, the parameters of the neural network are estimated. The neural network with the estimated parameters is then used in phoneme recognition as part of a speech recognition system.

SUMMARY

While deep neural networks (DNNs) are gaining attraction as phoneme recognition techniques, adapting a DNN to a particular user is a real challenge. According to at least one example embodiment, a method and corresponding apparatus for speech recognition comprise receiving, by a deep neural network, input speech data and corresponding speaker data. The deep neural network generates a prediction of a phoneme corresponding to the input speech data based on the speech data and the corresponding speaker data.

The input speech data may be part of training data used to train the DNN. The training data includes multiple speech data sets associated with multiple speakers. During training, different speech with corresponding speaker representation data are applied to the DNN as input. With each speech data and corresponding speaker representation data applied to the DNN as input, a corresponding prediction of the corresponding phoneme is generated, and weighting coefficients of the deep neural network are updated based on the prediction of the phoneme generated and information in the training data. Alternatively, the input speech data may be deployment speech data collected by a speech recognition system.

According to an example embodiment, the speaker data is generated from the corresponding input speech data using maximum likelihood linear regression (MLLR). According to another example embodiment, the speaker data is generated from the corresponding input speech data using constrained maximum likelihood linear regression (CMLLR). The dimensionality of the speaker data may be reduced using, for example, principal component analysis (PCA) prior to applying the speaker data as input to the DNN. The dimensionality reduction leads to a simpler DNN with fewer input nodes compared to the case where no reduction in dimensionality is performed. A person skilled in the art should appreciate that other techniques, other than PCA, may be employed in reducing dimensionality of the speaker data.

According to at least one example embodiment, the prediction of the phoneme generated includes a probability score. Alternatively, the prediction of the phoneme generated includes an indication of a phoneme. The output of the DNN is used to train Gaussian mixture models employed in speech recognition with an automatic speech recognition (ASR) system. According to at least one aspect, the Gaussian mixture models are adapted using the speaker data.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

FIG. 3 is a table illustrating simulation results associated with different ASR systems.

DETAILED DESCRIPTION

A description of example embodiments of the invention follows.

With significant advances achieved in automatic speech recognition (ASR), many speech based interaction applications enjoyed commercial success. Such success calls for further improvements in the performance of ASR systems. Specifically, even when large data is used for training ASR systems, the differences in speakers and environment between training and testing data still result in recognition errors.

Deep belief neural networks (DNNs) are widely used in ASR systems. However, adaptation of DNNs employed in ASR systems to different speakers presents a real challenge. In typical ASR systems based on a neural network, speaker adaptation may be performed, for example, by adjusting the weighting parameters of one or more layers of the neural network based on speaker dependent data. Such approach assumes availability of large amount of speaker dependent data. However, in most real speech recognition applications, target speaker data is limited, and generating speaker dependent models is usually computationally costly. Alternatively, a speaker dependent linear input network may be employed in concatenation with a speaker independent neural network (NN) to reduce speaker variability. The speaker dependent linear input network usually adds to the complexity of the corresponding ASR system. Other techniques for addressing speaker variability include transforming weighting coefficients associated with a layer of the DNN or adapting input features to the DNN.

Figure 1:
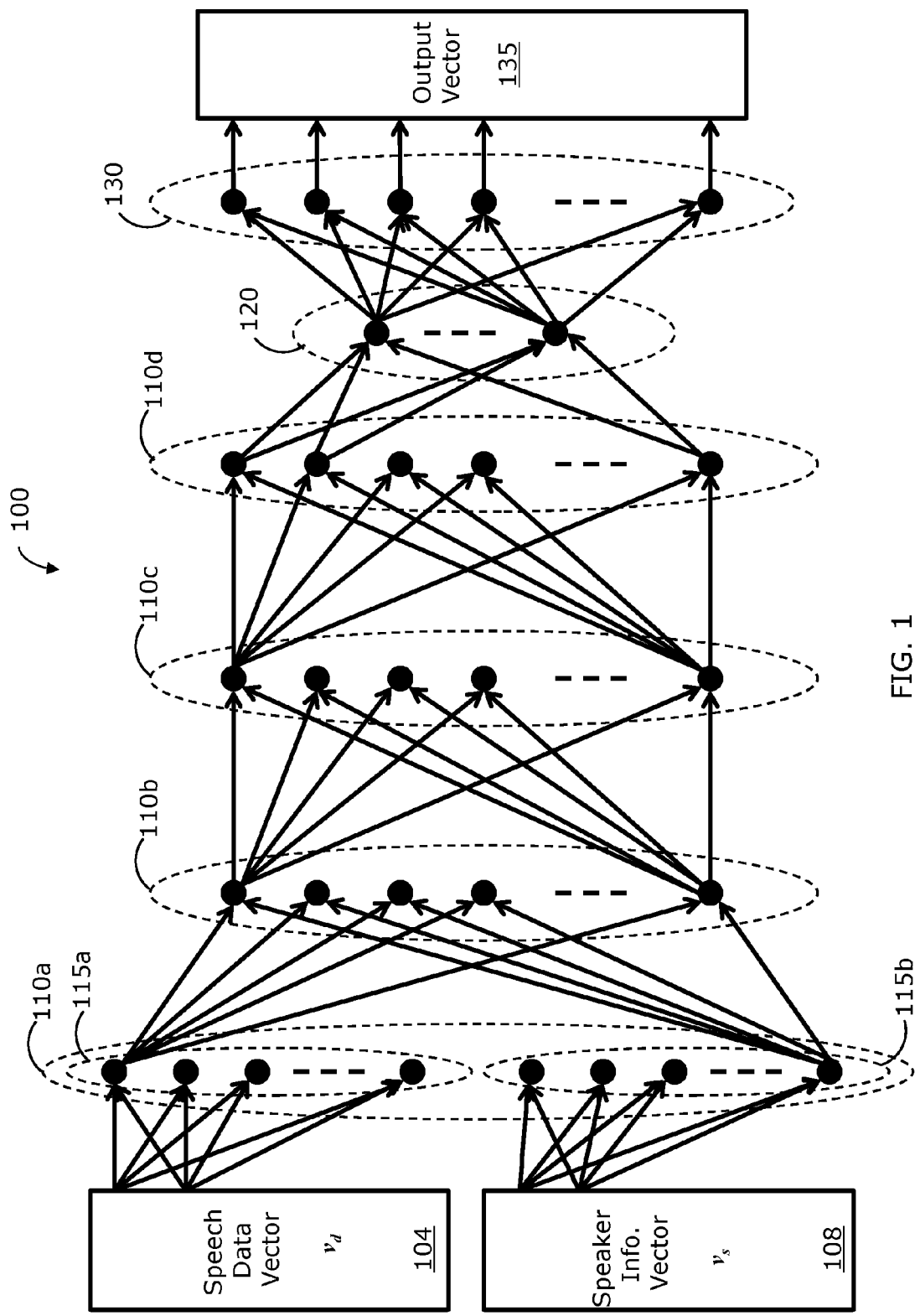
FIG. 1 is a diagram illustrating a deep belief neural network (DNN) for automatic speech recognition (ASR), according to at least one example embodiment.

FIG. 1 is a diagram illustrating a deep belief neural network (DNN) 100 for automatic speech recognition (ASR), according to at least one example embodiment. The DNN 100 includes multiple hidden layers, e.g., 110a-110d, a bottleneck layer 120 and an output layer 130. According to at least one example embodiment, the first hidden layer 110a includes a first set of nodes 115a configured to receive speech data 104, and a second set of nodes 115b configured to receive speaker representation data 108. Entries of the input speech data 104 are multiplied with a first matrix of weighting coefficients $W_1$, whereas entries of the speaker representation data 108 are multiplied with a second matrix of weighting coefficients $W_s$. That is, speaker representation is introduced as an extra input to the DNN 100 to remove speaker variability. At the first hidden layer 110a, input data is processed as:

$$z_1 = W_1^T \cdot v_d + W_s^T \cdot v_s + b_1, \quad (1)$$

where $v_d$ is an input speech data vector 104, $v_s$ is a speaker representation data vector 108, and $b_1$ is a bias vector. The output of each node of the first hidden layer 110*a* is defined as:

$$h_1(k)=f(z_1(k)), \quad (2)$$

where k is a node index, $h_1$ represents the output vector of the first hidden layer 110*a*, and $f(\bullet)$ is an activation function.

The output vector of the first hidden layer 110*a* is multiplied with a matrix of weighting coefficients $W_2$, corresponding to the second hidden layer 110*b*, a corresponding bias vector $b_2$ is added and the activation function $f(\bullet)$ is applied at each node of the second hidden layer 110*b*. The same process is applied through the different hidden layers, e.g., 110*a*-110*d*. The output vector of the last hidden layer, e.g., 110*d*, is multiplied with a corresponding matrix of weighting coefficients, a corresponding bias vector is added, and the result is passed to the nodes of the bottleneck layer 120. At each of the nodes of the bottleneck layer 120, the activation function $f(\bullet)$ is applied to the corresponding input. The output vector of the bottleneck layer 120 is also multiplied with a corresponding matrix of weighting coefficients, a corresponding bias is added, and the result is passed to the nodes of the output layer 130.

At the output layer 130, the posterior probabilities are computed via a soft-max layer, $$h_o(i) = \frac{\exp(z_o(i))}{\Sigma_k \exp(z_o(k))},$$

where i and k represent node indices in the output layer 130, and $z_o$ represents the input vector to the output layer 130. According to at least one example embodiment, the parameters of the DNN 100 are trained by maximizing the cross entropy defined as:

$$E=\Sigma_t\Sigma_i \hat{p}(i|x_t)\log p(i|x_t),$$

where $p(i|x_t)$ is an output of the DNN 100, and $\hat{p}(i|x_t)$ is the target probability, which is equal to 1 if i is the target label otherwise 0. In other words, given a training data set with a number of phonemes, for each utterance used in training the DNN 100, the target probability $\hat{p}(i|x_t)$ is equal to 1 if i is indicative of the same phoneme and $\hat{p}(i|x_t)$ is equal to 0 if i is indicative of another phoneme other than the one fed to the DNN 100 as input. The DNN 100 provides an output vector 135 having the probabilities $p(i|x_t)$ as entries.

For each phoneme used to train, or test, the DNN 100, the acoustic features associated with the phoneme as well as a corresponding speaker representation, indicative of voice characteristics of the corresponding speaker, are fed as input to the DNN 100. As such, the parameters of the DNN 100 are adjusted based on both speech data and speaker information. By training the DNN 100 with both the speaker representation data 108 and the speech data 104, the recognition performance of the trained DNN 100 is improved especially under speaker variability.

According to at least one example embodiment, the speaker representation data 108 includes features reflecting speaker voice characteristics. The features reflecting speaker voice characteristics are extracted, for example, from the corresponding speech data 104. For example, the features reflecting speaker voice characteristics may be constrained maximum likelihood linear regression (CMLLR) transformations estimated from corresponding speech data using an auxiliary hidden Markov model, or Gaussian Markov model (HMM/GMM). The CMLLR typically provides a set of transformations for adapting, for example, an initial speaker-independent HMM system to speaker-dependent data. In other words, the CMLLR transformations transform the parameters of the speaker-independent HMM system in a way to improve the recognition performance of the HMM system when speaker-dependent data is applied as input. According to at least one example implementation, CMLLR transformation parameters are arranged in a vector form, augmented with corresponding speech data, and fed as input to the DNN 100.

According to at least one example embodiment, the speaker representation data 108 is fed, with speech data corresponding to same speaker, as input to the DNN 100 in both training and test phases. In typical conventional ASR systems, a DNN model is first trained and then speaker-dependent adaptation may be performed. However, by training the DNN 100 with the speaker representation data 108, the resulting trained DNN is trained to recognize inter-speaker variability. The speaker representation data 108 may be estimated using speaker adaptation methods for HMM/GMM system known in the art. A person skilled in the art should appreciate that the estimation of the speaker representation data 108 may be achieved according to different speaker adaptation methods. Also, maximum likelihood linear regression (MLLR) transformations, or any other speaker adaptation representation or features, may be employed as speaker representation data 100. As such, the DNN 100 is configured to employ speaker representation data 108 generated based on any speaker adaptation approach.

For a DNN trained with normalized features, usually limited CMLLR is applied. In limited CMLLR, a one-class based transform is estimated from all data, e.g., speech and silence. If CMLLR with multiple transforms is used, transcription and segmentation are applied to the test data or multiple DNN features are generated for different transforms. The limited CMLLR is impractical in a one-pass based system and the CMLLR with multiple transforms is computationally expensive. However, applying the CMLLR transforms as input to the DNN 100 does not limit the CMLLR transforms to a one-class based transform. The speaker representation data 108 provided as input to the DNN 100 may be multiple CMLLR transforms or transforms from both CMLLR and MLLR.

Figure 2:
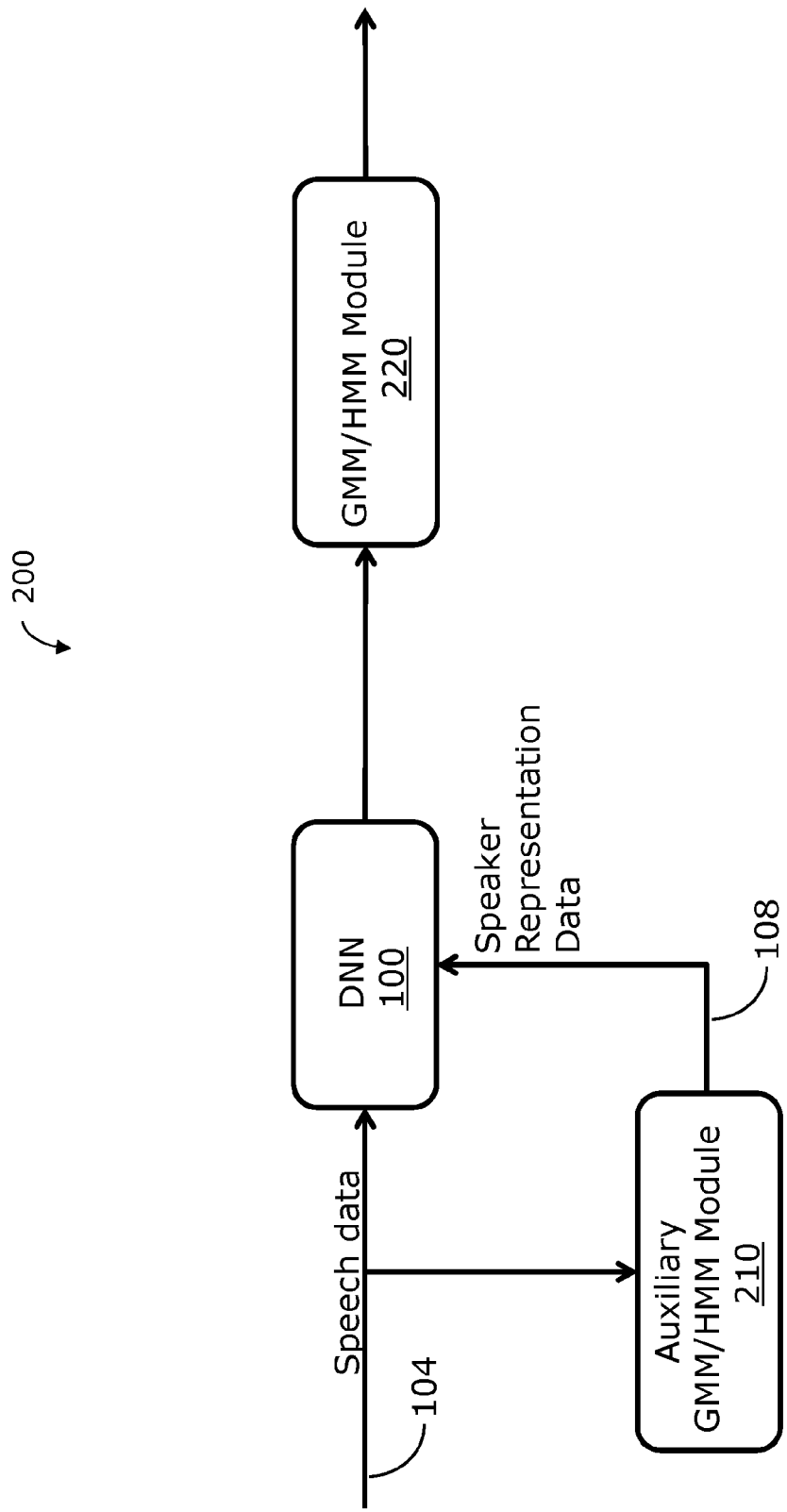
FIG. 2 is a block diagram illustrating functional blocks of an automatic speech recognition (ASR) system, according to at least one example embodiment.

FIG. 2 is a block diagram illustrating functional blocks of an automatic speech recognition (ASR) system 200, according to at least one example embodiment. Speech data 104 associated with a corresponding speaker is applied to an auxiliary GMM/HMM module 210. The auxiliary GMM/HMM module 210 generates speaker representation data 108 based on the input speech data 104. For example, ten minutes of data per speaker is employed during training to estimate CMLLR transforms at the auxiliary HMM/GMM module 210. The speech data 104 and the corresponding speaker representation data 108 are then input to the DNN 100. Principal component analysis (PCA) may be applied to the estimated CMLLR transforms to reduce corresponding dimensions, and the CMLLR transforms with reduced dimensions are applied as input to the DNN 100 with the corresponding speech data 104. A person skilled in the art should appreciate that the speaker representation data may be CMLLR transforms, MLLR transforms, or other type of speaker representation data known in the art.

According to an example embodiment, the output of the DNN 100 is then applied to a GMM/HMM module 220. The output of the DNN 100 may be in the form of probability scores. Each output probability score is indicative of the probability that a corresponding phoneme corresponds to the speech data 104 applied as input to the DNN 100. Alternatively, the output of the DNN 100 may be in the form of an indication of a phoneme predicted to correspond to the applied speech data. According to another example embodiment, in a deployment phase of the ASR system 200, input to the bottleneck layer 120 is used, instead of output of the DNN 100, as input to the GMM/HMM module 220 for speech recognition. According to at least one aspect, speaker adaptation is applied to the GMM/HMM module 220. Typical speaker adaptation techniques include MLLR, CMLLR, MAP, or a combination thereof.

FIG. 3 is a table illustrating simulation results associated with different ASR systems. Four different ASR systems are simulated and the corresponding results are shown in the table of FIG. 3. The first ASR system is a HMM/GMM model. Mel frequency cepstrum coefficients (MFCC) extracted from recorded speech are provided as input to the HMM/GMM model. The corresponding simulation results are shown in the first row of the table in FIG. 3.

The second ASR system is a concatenation of a DNN and a HMM/GMM model. Extracted MFCC features are applied as input to the DNN, and the output of the DNN as applied as input to the HMM/GMM model for speech recognition. The DNN in the second simulated ASR system has an input layer with 528 nodes, followed by five hidden layers each having 1000 nodes, followed by another hidden layer having 500 nodes, followed by a bottleneck layer with 40 nodes, followed by another hidden layer having 500 nodes, and finally an output layer having 1000 nodes. No speaker data is fed to the DNN of the second ASR system simulated. In the simulations, input to the bottleneck layer 120 is used as input to the GMM/HMM model for speech recognition. The corresponding simulation results are shown in the second row of the table in FIG. 3.

The third ASR system simulated is similar to the one shown in FIG. 2 and includes a concatenation of a DNN 100 and a GMM/HMM module 220. The DNN 100 is fed, as input, with speech data 104 and corresponding CMLLR transforms as speaker data 108. The DNN in the third simulated ASR system has an input layer with (1416+528) nodes, followed by five hidden layers each having 1000 nodes, followed by another hidden layer having 500 nodes, followed by a bottleneck layer with 40 nodes, followed by another hidden layer having 500 nodes, and finally an output layer having 1000 nodes. The input layer includes 528 nodes associated with input MFCC features and 1416 nodes associated with CMLLR data. The CMMLR transforms are generated based on four minutes of speaker dependent speech data using an auxiliary GMM/HMM module 210. Two CMLLR transforms are used each having 48×48 dimension. Principal component analysis (PCA) is applied to entries associated with the two CMLLR transforms and the number of entries is reduced to 1416 entries. The reduced entries are provided as an input vector 108 to the DNN 100. In the simulations, input to the bottleneck layer 120 is used as input to the GMM/HMM model for speech recognition. The corresponding simulation results are shown in the third row of the table in FIG. 3.

The fourth ASR system simulated is similar to the one shown in FIG. 2 and includes a concatenation of a DNN 100 and a GMM/HMM module 220. The DNN 100 is fed, as input, with speech data 104 and corresponding MLLR transforms as speaker data 108. The DNN in the fourth simulated ASR system has an input layer with (500+528) nodes, followed by five hidden layers each having 1000 nodes, followed by another hidden layer having 500 nodes, followed by a bottleneck layer with 40 nodes, followed by another hidden layer having 500 nodes, and finally an output layer having 1000 nodes. The input layer includes 528 nodes associated with input MFCC features and 500 nodes associated with MLLR data. The MMLR transforms are generated based on four minutes of speaker dependent speech data using an auxiliary GMM/HMM module 210. Two MLLR transforms are used each having 48×48 dimension. Principal component analysis (PCA) is applied to entries associated with the two CMLLR transforms and the number of entries is reduced to 500 entries. The reduced entries are provided as an input vector 108 to the DNN 100. In the simulations, input to the bottleneck layer 120 is used as input to the GMM/HMM model for speech recognition. The corresponding simulation results are shown in the third row of the table in FIG. 3.

The data used to test the ASR systems simulated is different from the data used to train the ASR systems. Each of the ASR system simulated is tested with and without speaker adaptation applied to the GMM/HMM model 220. The column before the last in the table of FIG. 3 shows the word error rates (WER) for the ASR systems simulated with no speaker adaptation applied to the GMM/HMM model. The last column of the table in FIG. 3 shows the word error rates (WER) for the ASR systems simulated with speaker adaptation applied to the GMM/HMM model. The speaker adaptation applied to the GMM/HMM model is a combination of CMLLR, MLLR, and MAP adaptation. The adaptation parameters used are generated based on four minutes of speaker-dependent speech data.

The results shown in FIG. 3 clearly show that the third and fourth ASR systems simulated outperform, e.g., smaller WER, the first and second ASR system simulated. That is, by using speaker data as input to the DNN 100, speech recognition performance is significantly improved compared to the first and second ASR systems simulated. For example, the last column of the table in FIG. 3 shows that by using speaker data as input to the DNN 100, more than 11% improvement is achieved with respect to the first ASR system, and about 2.5% to 3.2% reduction in the WER is achieved with respect to the second ASR system simulated.

It should be understood that the example embodiments described above may be implemented in many different ways. In some instances, the various methods and machines described herein may each be implemented by a physical, virtual or hybrid general purpose or application specific computer having a central processor, memory, disk or other mass storage, communication interface(s), input/output (I/O) device(s), and other peripherals. The general purpose or application specific computer is transformed into the machines that execute the methods described above, for example, by loading software instructions into a data processor, and then causing execution of the instructions to carry out the functions described, herein.

As is known in the art, such a computer may contain a system bus, where a bus is a set of hardware lines used for data transfer among the components of a computer or processing system. The bus or busses are essentially shared conduit(s) that connect different elements of the computer system, e.g., processor, disk storage, memory, input/output ports, network ports, etc., which enables the transfer of information between the elements. One or more central processor units are attached to the system bus and provide for the execution of computer instructions. Also attached to the system bus are typically I/O device interfaces for connecting various input and output devices, e.g., keyboard, mouse, displays, printers, speakers, etc., to the computer. Network interface(s) allow the computer to connect to various other devices attached to a network. Memory provides volatile storage for computer software instructions and data used to implement an embodiment. Disk or other mass storage provides non-volatile storage for computer software instructions and data used to implement, for example, the various procedures described herein.

Embodiments may therefore typically be implemented in hardware, firmware, software, or any combination thereof.

In certain embodiments, the procedures, devices, and processes described herein constitute a computer program product, including a computer readable medium, e.g., a removable storage medium such as one or more DVD-ROM's, CD-ROM's, diskettes, tapes, etc., that provides at least a portion of the software instructions for the system. Such a computer program product can be installed by any suitable software installation procedure, as is well known in the art. In another embodiment, at least a portion of the software instructions may also be downloaded over a cable, communication and/or wireless connection.

Embodiments may also be implemented as instructions stored on a non-transitory machine-readable medium, which may be read and executed by one or more processors. A non-transient machine-readable medium may include any mechanism for storing or transmitting information in a form readable by a machine, e.g., a computing device. For example, a non-transient machine-readable medium may include read only memory (ROM); random access memory (RAM); magnetic disk storage media; optical storage media; flash memory devices; and others.

Further, firmware, software, routines, or instructions may be described herein as performing certain actions and/or functions of the data processors. However, it should be appreciated that such descriptions contained herein are merely for convenience and that such actions in fact result from computing devices, processors, controllers, or other devices executing the firmware, software, routines, instructions, etc.

It also should be understood that the flow diagrams, block diagrams, and network diagrams may include more or fewer elements, be arranged differently, or be represented differently. But it further should be understood that certain implementations may dictate the block and network diagrams and the number of block and network diagrams illustrating the execution of the embodiments be implemented in a particular way.

Accordingly, further embodiments may also be implemented in a variety of computer architectures, physical, virtual, cloud computers, and/or some combination thereof, and, thus, the data processors described herein are intended for purposes of illustration only and not as a limitation of the embodiments.

While this invention has been particularly shown and described with references to example embodiments thereof, it will be understood by those skilled in the art that various changes in form and details may be made therein without departing from the scope of the invention encompassed by the appended claims.

What is claimed is:

1. A computer implemented method for speech recognition, the method implemented by one or more processors and comprising:
receiving, by a deep neural network at a hidden layer, input speech data at a first set of nodes of the hidden layer of the deep neural network and corresponding speaker data at a second set of nodes of the hidden layer of the deep neural network, the second set of nodes serving as an extra input to the deep neural network; and
generating, by the deep neural network, a prediction of a phoneme corresponding to the input speech data based on the corresponding speaker data, wherein the generating comprises multiplying the input speech data received at the first set of nodes with a first matrix of weighting coefficients and multiplying the speaker data received at the second set of nodes with a second matrix of weighting coefficients, multiplying the speaker data with the second matrix of weighting coefficients removing speaker variability from the input speech data.

2. The method as recited in claim 1, wherein the input speech data is part of training data and said receiving and generating are repeated for input speech data and corresponding speaker data associated with multiple speakers, the method further comprising:
iteratively updating weighting coefficients of the deep neural network based on the prediction of the phoneme generated and information in the training data.

3. The method as recited in claim 1, wherein the input speech data is deployment speech data collected by a speech recognition system.

4. The method as recited in claim 1, wherein the speaker data is generated from the corresponding input speech data using maximum likelihood linear regression (MLLR).

5. The method as recited in claim 1, wherein the speaker data is generated from the corresponding input speech data using constrained maximum likelihood linear regression (CMLLR).

6. The method as recited in claim 1, wherein the prediction of the phoneme generated includes a probability score.

7. The method as recited in claim 1, wherein the prediction of the phoneme generated includes an indication of a phoneme.

8. The method as recited in claim 1 further comprising training a Gaussian mixture models' module using the prediction of the phoneme generated by the deep neural network.

9. The method as recited in claim 8, wherein the Gaussian mixture models' module is adapted using the speaker data.

10. The method as recited in claim 1 further comprising reducing dimensionality of the speaker data using principal component analysis (PCA) prior to reception by the deep neural network.

11. An apparatus for speech recognition comprising:
at least one processor; and
at least one memory with computer code instructions stored thereon,
the at least one processor and the at least one memory with computer code instructions being configured to cause the apparatus to:
receive, by a deep neural network at a hidden layer, input speech data at a first set of nodes of the hidden layer of the deep neural network and corresponding speaker data at a second set of nodes of the hidden layer of the deep neural network, the second set of nodes serving as an extra input to the deep neural network; and
generate, at an output layer of the deep neural network, a prediction of a phoneme corresponding to the input speech data based on the corresponding speaker data, wherein the generating comprises multiplying the input speech data received at the first set of nodes with a first matrix of weighting coefficients and multiplying the speaker data received at the second set of nodes with a second matrix of weighting coefficients, multiplying the speaker data with the second matrix of weighting coefficients removing speaker variability from the input speech data.

12. The apparatus as recited in claim 11, wherein the input speech data is part of training data and wherein the at least one processor and the at least one memory with computer code instructions are further configured to cause the apparatus to:
repeat receiving input speech data and corresponding speaker data and generating the prediction of the phoneme for multiple speakers; and
iteratively update weighting coefficients of the deep neural network based on the prediction of the phoneme generated and information in the training data.

13. The apparatus as recited in claim 11, wherein the input speech data is deployment speech data.

14. The apparatus as recited in claim 11, wherein the at least one processor and the at least one memory with computer code instructions are further configured to cause the apparatus to generate the speaker data from the corresponding input speech data using maximum likelihood linear regression (MLLR).

15. The apparatus as recited in claim 11, wherein the at least one processor and the at least one memory with computer code instructions are further configured to cause the apparatus to generate the speaker data from the corresponding input speech data using constrained maximum likelihood linear regression (CMLLR).

16. The apparatus as recited in claim 11, wherein the prediction of the phoneme generated includes a probability score or an indication of a phoneme.

17. The apparatus as recited in claim 11, wherein the at least one processor and the at least one memory with computer code instructions are further configured to cause the apparatus to train a Gaussian mixture models' module using the prediction of the phoneme generated.

18. The apparatus as recited in claim 17, wherein the Gaussian mixture models' module is adapted using the speaker data.

19. The apparatus as recited in claim 17, wherein the at least one processor and the at least one memory with computer code instructions are further configured to cause the apparatus to reduce the dimensionality of the speaker data using principal component analysis (PCA) prior to reception by the deep neural network.

20. A non-transitory computer-readable medium with computer code instructions stored thereon, the computer code instructions being configured, when executed by a processor, to cause an apparatus to:
receive, by a deep neural network at a hidden layer, input speech data at a first set of nodes of the hidden layer of the deep neural network and corresponding speaker data at a second set of nodes of the hidden layer of the deep neural network, the second set of nodes serving as an extra input to the deep neural network; and
generate, by the deep neural network, a prediction of a phoneme corresponding to the input speech data based on the corresponding speaker data, wherein the generating comprises multiplying the input speech data received at the first set of nodes with a first matrix of weighting coefficients and multiplying the speaker data received at the second set of nodes with a second matrix of weighting coefficients, multiplying the speaker data with the second matrix of weighting coefficients removing speaker variability from the input speech data.

* * * * *